(12) United States Patent
Yoon

(10) Patent No.: US 8,346,322 B2
(45) Date of Patent: Jan. 1, 2013

(54) TERMINAL AND SLIDING APPARATUS OF TERMINAL

(75) Inventor: Hyoung Chul Yoon, Gwangmyeong-si (KR)

(73) Assignee: Pantech Co., Ltd., Seoul (KR)

( * ) Notice: Subject to any disclaimer, the term of this patent is extended or adjusted under 35 U.S.C. 154(b) by 172 days.

(21) Appl. No.: 12/847,130

(22) Filed: Jul. 30, 2010

(65) Prior Publication Data

US 2011/0111813 A1   May 12, 2011

(30) Foreign Application Priority Data

Nov. 9, 2009   (KR) .................. 10-2009-0107468

(51) Int. Cl.
*H04M 1/00* (2006.01)

(52) U.S. Cl. ............... 455/575.4; 455/550.1; 455/575.1; 455/575.2; 455/575.3

(58) Field of Classification Search ............... 455/550.1, 455/575.1–575.4; D14/137–138 G
See application file for complete search history.

(56) References Cited

U.S. PATENT DOCUMENTS

| 7,690,576 | B2 * | 4/2010 | Ladouceur et al. ........... 235/486 |
| 8,018,714 | B2 * | 9/2011 | Luke et al. ................ 361/679.01 |
| 8,029,309 | B2 * | 10/2011 | Ou et al. ........................ 439/374 |
| 2008/0032637 | A1 * | 2/2008 | Ladouceur et al. .......... 455/90.3 |
| 2008/0081505 | A1 * | 4/2008 | Ou et al. ........................ 439/374 |
| 2008/0161075 | A1 * | 7/2008 | Kim et al. .................. 455/575.4 |
| 2009/0227301 | A1 * | 9/2009 | Lindvall ..................... 455/575.4 |
| 2009/0247247 | A1 * | 10/2009 | Jang ........................... 455/575.4 |
| 2010/0160010 | A1 * | 6/2010 | Ladouceur et al. ........ 455/575.4 |

* cited by examiner

*Primary Examiner* — Fayyaz Alam
(74) *Attorney, Agent, or Firm* — H.C. Park & Associates, PLC

(57) ABSTRACT

A terminal may include a first body, a second body connected to the first body, and a sliding apparatus to operate the first body and the second body between a first position in which the second body is disposed on the first body, and a second position in which the second body is inclined with respect to the first body. The sliding apparatus may include a connection body having a first end connected to the first body and a second end connected to the second body, and an operator to semi-automatically operate the second body relative to the first body between the first position and the second position.

19 Claims, 9 Drawing Sheets

1

TERMINAL AND SLIDING APPARATUS OF TERMINAL

CROSS-REFERENCE TO RELATED APPLICATION

This application claims priority from and the benefit under 35 U.S.C. §119(a) of Korean Patent Application No. 10-2009-0107468, filed on Nov. 9, 2009, in the Korean Intellectual Property Office, the disclosure of which is incorporated herein by reference.

BACKGROUND

1. Field

This disclosure relates to a terminal and a sliding apparatus of the terminal.

2. Discussion of the Background

An example of general terminals by which a user transmits/receives signals with another party is a mobile communication terminal that allows the user to communicate with the other party even when the user is moving. Such a mobile terminal may be a cellular phone, a personal communication service (PCS) phone, a personal digital assistant (PDA), and the like. The general terminals may be classified into a bar type, a flip type, a folder type, a slide type, and the like based on the structure or form of the terminal. These various types of mobile communication terminals may be further classified based on a display panel on which information is displayed and input keys through which information is inputted.

Generally, the slide-type terminal may include an upper body having the display panel formed thereon to be exposed to the outside and a lower body in which a region of the lower body is selectively opened by a sliding movement. In this instance, when the upper body slides relative to the lower body, the input keys mounted in the lower body are exposed to enable an input via the input keys for execution of a function.

In addition, in a case of the general slide-type terminal, a sliding direction of the terminal is created in such a manner that the upper body slides parallel to the lower body. Specifically, the upper body and the lower body slide along planes while separated by a distance between the upper body and the lower body.

Accordingly, inconvenience may occur in that the user should manipulate the upper body to align information displayed through the slid upper body with a viewing angle of the user, or in that the user should slouch to face the terminal. If multimedia services, such as moving pictures and the like, are provided using the terminal, it may be cumbersome and inconvenient for a user to use a separate holding stand for the terminal to adjust the viewing angle in order to watch the multimedia services.

SUMMARY

Exemplary embodiments of the present invention provide a terminal including two bodies facing each other, which may enable one of the two bodies to slide relative to the other body in an inclined manner, and provide a sliding apparatus of the terminal.

Additional features of the invention will be set forth in the description which follows, and in part will be apparent from the description, or may be learned by practice of the invention.

An exemplary embodiment provides a terminal including a first body; a second body connected to the first body; and a sliding apparatus to operate the first body and the second body between a first position in which the second body is disposed adjacent to the first body, and a second position in which the second body is inclined with respect the first body and the second body, wherein the sliding apparatus includes: a connection body including a first end connected to the first body and a second end connected to the second body, the connection body being inclined with respect to the first body and the second body disposed in the first position; and an operator to transmit to the connection body a sliding operation force applied to the second body, the operator to semi-automatically operate the second body relative to the first body between the first position and the second position.

An exemplary embodiment provides a sliding apparatus for a terminal including a first body and a second body, the apparatus including: a connection body connected to the first body at a first end of the connection body and connected to the second body at a second end of the connection body, the connection body being inclined with respect to the first body and the second body when the first body and the second body are disposed in a first position in which the second body is disposed on the first body, the first end of the connection body being coupled to the first body, and the second end of the connection body being movable within a sliding groove disposed on the second body; a first operator connected to the first body at a first end of the first operator and connected to the second body at a second end of the first operator, the second end of the first operator being pressurized toward the first end of the first operator; and a second operator disposed between the second body and the second end of the connection body and selectively compressed in cooperation with a sliding movement of the second body.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
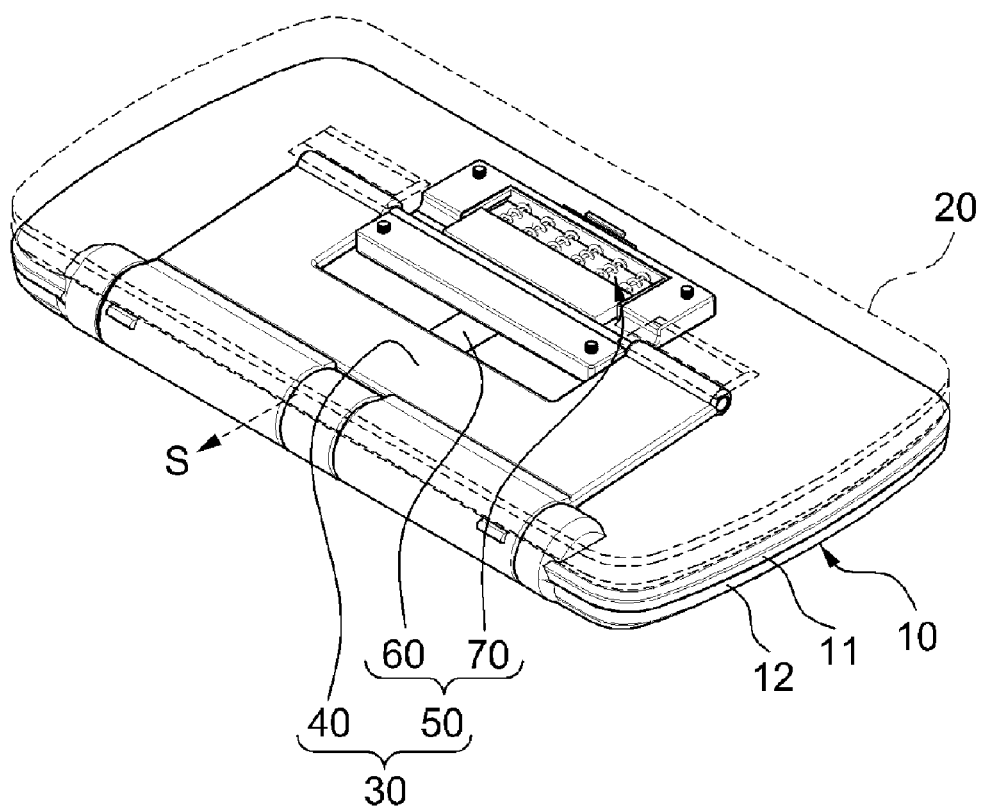
FIG. 1 is a schematic perspective view illustrating a terminal according to an exemplary embodiment.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

FIG. 1 is a schematic perspective view illustrating a terminal 1 according to an exemplary embodiment. Referring to FIG. 1, the terminal 1 includes a first body 10, a second body 20, and a sliding apparatus 30. The terminal 1 may be a handheld terminal, such as a mobile phone, a personal digital assistant (PDA), a digital multimedia broadcasting (DMB) equipment, and the like.

The first body 10 may be formed into a rectangular-like shape, and include an upper body 11 and a lower body 12. Specifically, the first body 10 may be formed by combining the upper body 11 and the lower body 12 with each other.

The second body 20 may face the first body 10. The second body 20 may be formed into a shape to conform to the first body 10 so that the second body 20 may be completely disposed on the first body 10 and be of a similar shape. Here, the second body 20 may be operatively connected to the first body 10. That is, the second body 20 may be connected to the first body 10 in a way that permits the sliding apparatus 30 to operate as described in more detail below when the terminal 1 is moved from an open position to a closed position, and from the closed position to the open position. When the second body 20 is disposed on the first body 10, the upper body 11 of the first body 10 may be disposed adjacent to the second body 20, and the lower body 12 of the first body 10 may be disposed away from the second body 20.

Although not illustrated in FIG. 1, the first body 10 and the second body 20 may include a variety of features, such as input keys, display panels, speakers, cameras, and the like. The first body 10 may be a main body of the terminal 1 including input keys where information is inputted, and the second body 20 may be a cover including a display panel where information is displayed, however, aspects are not limited thereto.

Figure 2:
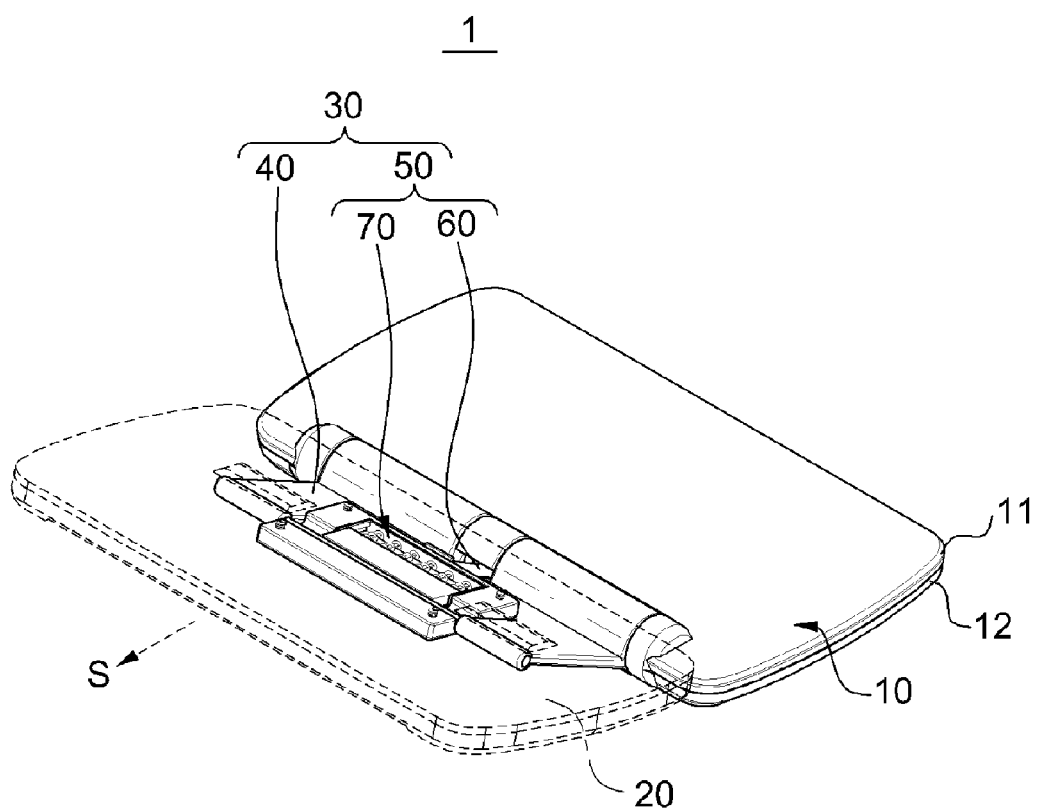
FIG. 2 is a schematic perspective view illustrating a terminal according to an exemplary embodiment.

The sliding apparatus 30 may perform a sliding operation of the first body 10 and the second body 20 between a first position in which the first body 10 and the second body 20 are completely stacked one on another to face each other as illustrated in FIG. 1, and a second position in which the first body 10 and the second body 20 are inclined relative to each other while being located away from the first position as illustrated in FIG. 2. To perform the sliding operation, the sliding apparatus 30 includes a connection body 40 and an operator 50. Here, if the second body 20 is moved to the second position as illustrated in FIG. 2, the sliding apparatus 30 may guide the second body 20 such that a front surface of the first body 10 is opened or exposed.

Figure 3:
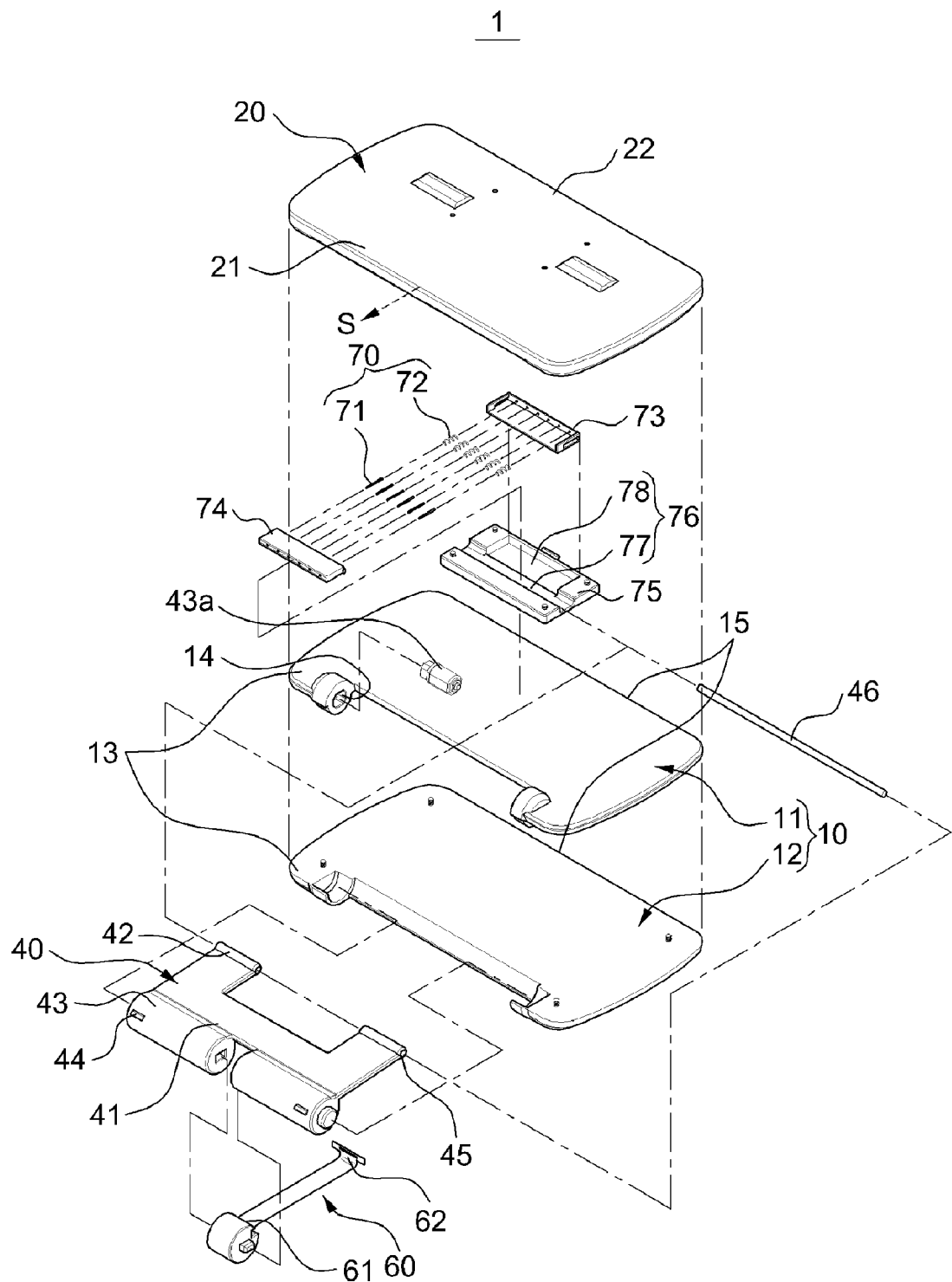
FIG. 3 is an exploded perspective view illustrating a terminal according to an exemplary embodiment.

As shown in FIG. 3, the connection body 40 may be connected to the first body 10 at a first end 41 of the connection body 40, and the connection body 40 may be connected to the second body 20 at a second end 42 of the connection body 40.

Here, the first end 41 of the connection body 40 may be rotatably connected to the first body 10, and the second end 42 of the connection body 40 may be operatively connected to the second body 20. Specifically, the first end 41 of the connection body 40 may be a fixed end in which a connection position between the first end 41 and the first body 10 is fixed, and the second end 42 of the connection body 40 may be a free end in which a connection position between the second end 42 and the second body 20 is movable. A hinge 43 may be formed in the first end 41 of the connection body 40 along a direction S (hereinafter, referred to as "sliding direction") in which the second body 20 slides, so that the hinge 43 may be rotatably coupled to a hinge shaft 14 formed on a front end 13 of the first body 10. The front end 13 of the first body 10 is opposite a rear end 15 of the first body 10. Here, the hinge 43 may be coupled to the hinge shaft 14 via a click hinge 43a interposed therebetween, and thereby the hinge 43 may generate a rotation moment for the first body 10.

In addition, the hinge 43 includes a hinge protrusion 44 disposed thereon to restrict a rotation angle of the connection body 40. The hinge 43 may be a click hinge. The hinge protrusion 44 may restrain the rotation angle of the connection body 40 when the second body 20 is moved to the second position as illustrated in FIG. 2. A tilt angle of the hinge body 20 may be determined based on a position of the hinge protrusion 44. Also, a hollow rod hole 45 is formed in the second end 42 of the connection body 40, and a pressurization rod 46 may be inserted into the rod hole 45. The second end 42 of the connection body 40 may be biasedly connected to the second body 20 so that the second end 42 moves from a rear end 22 of the second body 20 in the first position of the first body 10 and the second body 20 toward a front end 21 of the second body 20 in the second position of the first body 10 and the second body 20.

Figure 4A:
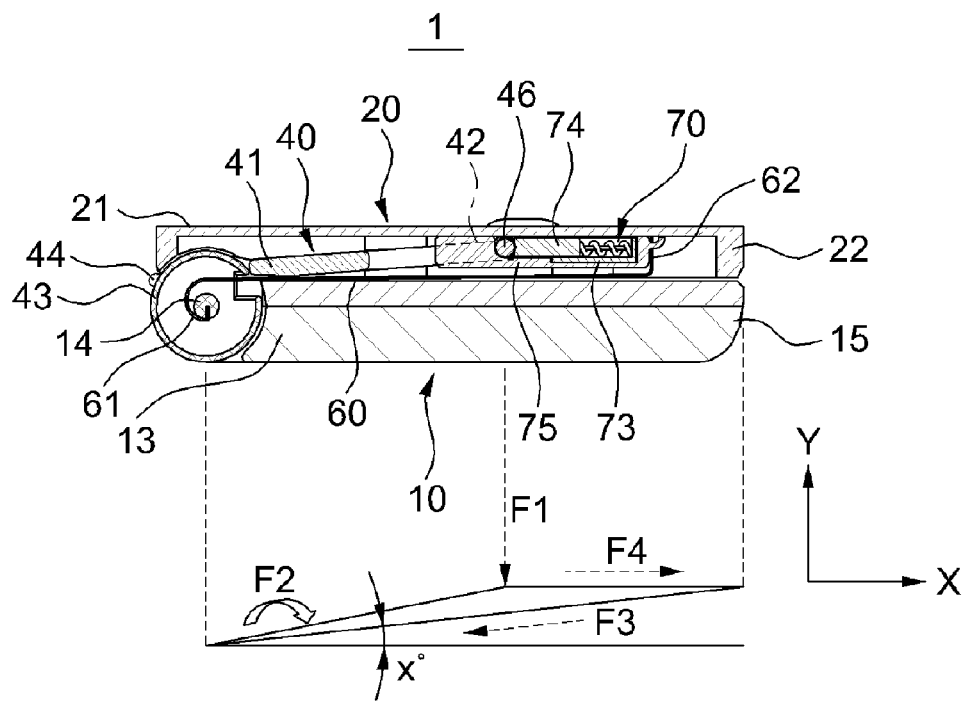
FIG. 4A is a cross-sectional view illustrating the terminal of FIG. 1 disposed in a first position.

A tilt angle X° between the first end 41 and the second end 42 of the connection body 40 may be 3° to 7° with respect to the hinge shaft 14, as illustrated in FIG. 4A in the first position of the first body 10 and the second body 20. For example, the tilt angle X° may be 5°. However, the second body 20 may interfere with an inner area of the first body 10 with the increase in the tilt angle X°, and thereby miniaturization of the terminal 1 may depend upon the tilt angle X°. Therefore, the tilt angle X° of the connection body 40 may be selected according to a desired size of the terminal 1.

If a pressurization force P exerted in the sliding direction S is applied to the second body 20 connected to the connection body 40, the second body 20 may slide using a reaction of the hinge 43. Here, along with an increase in the tilt angle X° between the first end 41 and the second end 42 of the connection body 40 based on the hinge shaft 14 of the connection body 40, a sliding resistance of the second body 20 may increase.

The operator 50 may include a transmission portion to transmit to the connection body 40 a sliding operation force applied to the second body 20, and may semi-automatically operate the second body 20 relative to the first body 10 between the first position and the second position. The transmission portion may include a support plate 73 and a pressurization body 74, which are described hereinafter. To operate the second body 20, the operator 50 may include a first operator 60 and a second operator 70.

A first end 61 of the first operator 60 may be connected to the first body 10, for example, at the front end 13 of the first body 10, and a second end 62 of the first operator 60 may be connected to the second body 20, for example, at the rear end 22 of the second body 20. The second end 62 of the first operator 60 may be elastically pressurized towards the first end 61 of the first operator 60. For example, the first end 61 may be connected to the first body 10, and the second end 62 may be pressurized towards the first end 61 while being connected to the second body 20. The first end 61 may be coupled to the hinge 43 formed on the first end 41 of the connection body 40, and more specifically, may be coupled to the hinge shaft 14 to thereby be coupled to the first body 10. The second end 62 may be biasedly connected to the rear end 22 of the second body 20. Thus, the first operator 60 may elastically pressurize the rear end 22 of the second body 20 towards the front end 13 of the first body 10. Thus, when a force balance between the first body 10 and the second body 20 positioned in the first position is broken, the second end 62 may be moved towards the first end 61.

The second end 62 of the first operator 60 may be a clockwork spring, for example, a leaf spring having a tensile force generated by the first end 61 being wound around the hinge shaft 14. Also, a stroke of the first operator 60 may be variable depending on sizes of the first and second bodies 10 and 20 and a connection position between the first and second bodies 10 and 20; however, a length of the stroke may be 53 mm or more. In addition, conditions such as a shape of the first operator 60, the stroke, and the like may be diversely variable depending on conditions of the terminal 1.

The second operator 70 may be compressed in the sliding direction S of the second body 20 to have a same length as that of the transmission portion. Further, a plurality of second operators 70 including a compressible elastic shaft 71 and a spring 72 coupled to the is elastic shaft 71 may be provided; however, a general compression coil spring may be used. Also, a first end of the second operator 70 may be supported in a state of being connected to a support plate 73, and a second end of the second operator 70 may be connected to a pressurization body 74 connected to the second end 42 of the connection body 40. Specifically, the first end of the second operator 70 may be connected to the support plate 73 to be supported, and the second end of the second operator 70 may be connected to the pressurization body 74 to selectively operate the second end 42 of the connection body 40.

If the pressurization force P (shown in FIG. 5A) is applied to the second body 20 in the sliding direction S of the second body 20, the second operator 70 may slide the second body 20 over a length of the transmission portion, that is, to have a compressed range of the second body 20, without directly transmitting the pressurization force P to the hinge shaft 14 formed on the first body 10, and then operate the second body 20 in an inclined manner toward the sliding direction S in a semi-automatic manner. In this manner, the second operator 70 may transfer the pressurization force P via the transmission portion.

The second body 20 may include a sliding plate 75 having a sliding groove 76 formed thereon. In this instance, the second end 42 of the connection body 40 and the second operator 70 may be inserted into the sliding groove 76, and the transmission portion may be provided within the sliding groove 76. Here, the sliding groove 76 may include a first groove 77 providing a space in which the pressurization rod 46 connected to the second end 42 of the connection body 40 is operated, and a second groove 78 providing a space in which the second operator 70 is compressed and restored. The first groove 77 and the second groove 78 may be formed into a shape to conform to the pressurization rod 46 and the second operator 70, respectively. The second operator 70 may have a compression stroke having a range of about 3.0 mm to 5.0 mm, for example, the compression stroke may be 3.4 mm. The second operator 70 stores a compressed elastic force, and the second body 20 may be semi-automatically moved to the second position after a pressurization force of the compression stroke is applied from the first position towards the second position. In addition, by the elastic force of the second operator 70, a force applied to the second end 42 of the connection body 40 and a reaction applied to the hinge 43 formed on the first end 41 of the connection body 40 may induce the second body 20 to slide in the sliding direction S in an inclined manner.

Sliding operations of the terminal 1 according to an exemplary embodiment will be described in detail with reference to FIGS. 4A to 9.

Referring to FIG. 4A, the first body 10 and the second body 20 are positioned in the first position. As illustrated in FIG. 4A, the front ends 13 and 21 of the first and second bodies 10 and 20, respectively, and rear ends 15 and 22 of the first and second bodies 10 and 20, respectively, may face each other. In this instance, as illustrated in FIG. 4A, a force F1 of the second body 20, a rotation force F2 of the hinge 43 connected to the first end 41 of the connection body 40, an elastic force F3 of the first operator 60, and an elastic force F4 of the second operator 70 may be in a state of static equilibrium. As a result, the first body 10 and the second body 20 may maintain the first position until an external force is applied to the first body 10 and the second body 20.

Specifically, a resultant force FX in an X-axis the balance state the rotation force F2 (converted from the moment corresponding to rotation for F2 into an axial force F2 in the X-axis) of the hinge 43 connected to the first end 41 of the connection body 40, the elastic force F3 of the first operator 60, and the elastic force F4 of the second operator 70 may be described by Equation 1.

$$FX = F2 + F4 - F3 \cdot \cos X \geq 0. \quad [\text{Equation 1}]$$

Here, as for a Y-axis, directions of all forces F1, F2, and F3, excluding the elastic force F4 of the second operator 70 may correspond to a negative direction of the Y-axis.

Figure 4B:
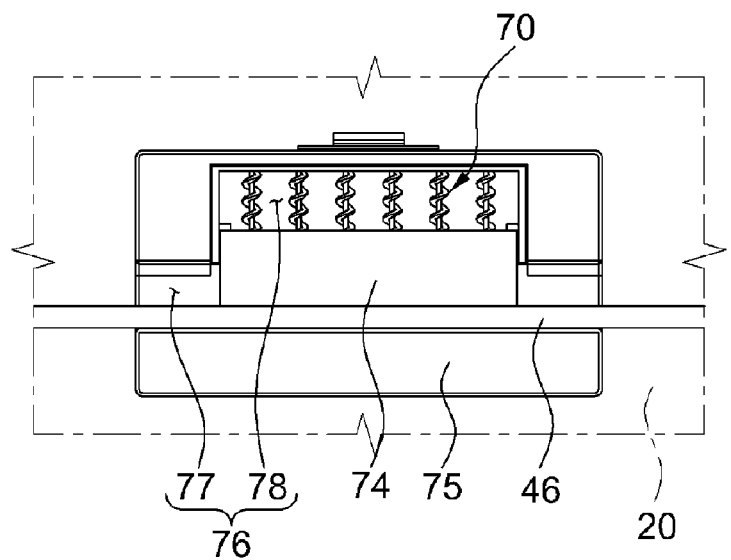
FIG. 4B is a top view illustrating a pressurization rod and a second operator when is the terminal of FIG. 1 is disposed in the first position.

As illustrated in FIG. 4B, which is a top view illustrating a pressurization rod and a second operator when the terminal of FIG. 1 is disposed in the first position, the pressurization rod 46 is disposed in the first groove 77 of the sliding groove 76 of the sliding plate 75, and may be at a position farthest rear end 22 of the second body 20. The pressurization body 74 is disposed adjacent to the pressurization rod 46, and the second operator 70 is connected to the pressurization body 74.

Figure 5A:
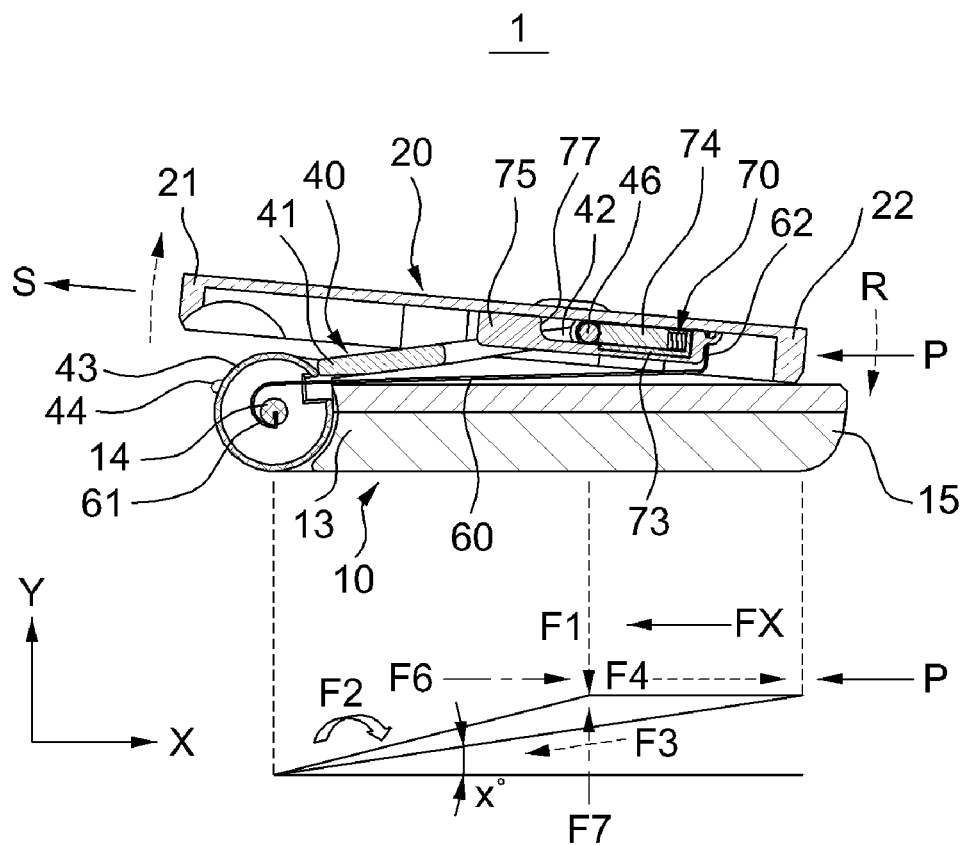
FIG. 5A is a schematic cross-sectional view illustrating the terminal of FIG. 1 pressurized in a sliding direction.
Figure 5B:
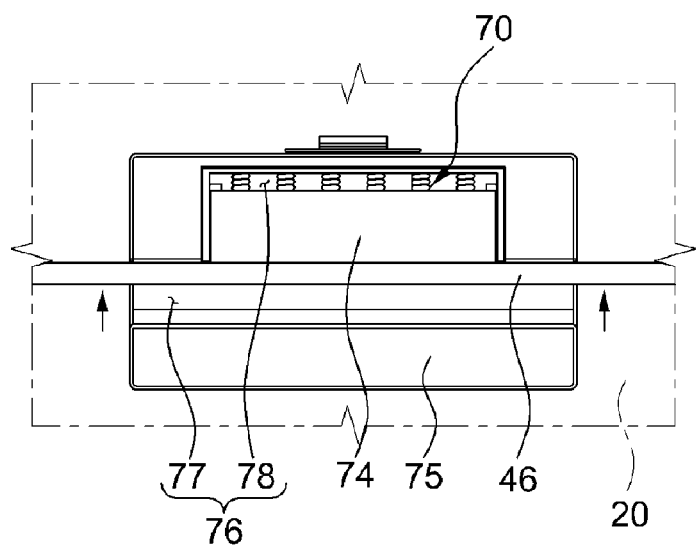
FIG. 5B is a top view illustrating a pressurization rod and a second operator when the second body of the terminal of FIG. 1 is pressurized in a sliding direction.

As illustrated in FIG. 5A, if the pressurization force P exerted in the sliding direction S is applied to the rear end 22 of the second body 20, the second body 20 may slightly slide in the sliding direction S by a distance. In cooperation with the sliding movement of the second body 20, the pressurization body 74 mounted on the second body 20 may be relatively moved along the sliding direction S as shown in FIG. 5B. Thus, the pressurization rod 46 connected to the second end 42 of the connection body 40 inserted into the first groove 77 may be moved towards the rear end 22 of the second body 20 within the first groove 77, and at the same time, the second operator 70 may be compressed within the second groove 78 of the sliding groove 76. Here, the second operator 70 may be compressed to have a length of a compression stroke of about 3.4 mm. In this instance, the pressurization rod 46 mounted in the rear end 22 of the connection body 40 may be moved within the first groove 77 by a movement of the second body 20, and thereby the front end 21 of the second body 20 may be upwardly raised. Specifically, the front end 21 and the rear end 22 of the second body 20 may be rotated in a direction R of FIG. 5A with respect to the pressurization rod 46, and thereby the second body 10 may slide relative to the first body 10 in an inclined manner.

As illustrated in FIG. 5A, when the pressurization force P is transmitted to the pressurization rod 46 and the hinge 43 formed on the first end 41 of the connection body 40, the resultant force FX may be described by Equation 2.

$$FX = F2 + F4 - F3 \cdot \cos X° - P \leq 0. \quad \text{[Equation 2]}$$

In this instance, an action/reaction are generated on a shaft of the pressurization rod 46, that is, a point of contact of forces, and force F7 may be exerted in a positive direction of the Y-axis. Here, a resultant force FX of the X-axis of Equation 2 may be exerted on the second body 20 in the sliding direction S, and thereby the second body 20 may be moved to the second position. In this instance, the moment created by the elastic force F3 of the first operator 60 about the pressurization rod 46 causes the second body 20 to be rotated in the R direction with respect to the pressurization rod 46. Specifically, the rear end 22 of the second body 20 may be brought in close contact with the first body 10, and at the same time, the front end 21 of the second body 20 may be spaced apart from the first body 10, and thereby the second body 20 may slide relative to the first body 10 in an inclined manner.

Figure 6:
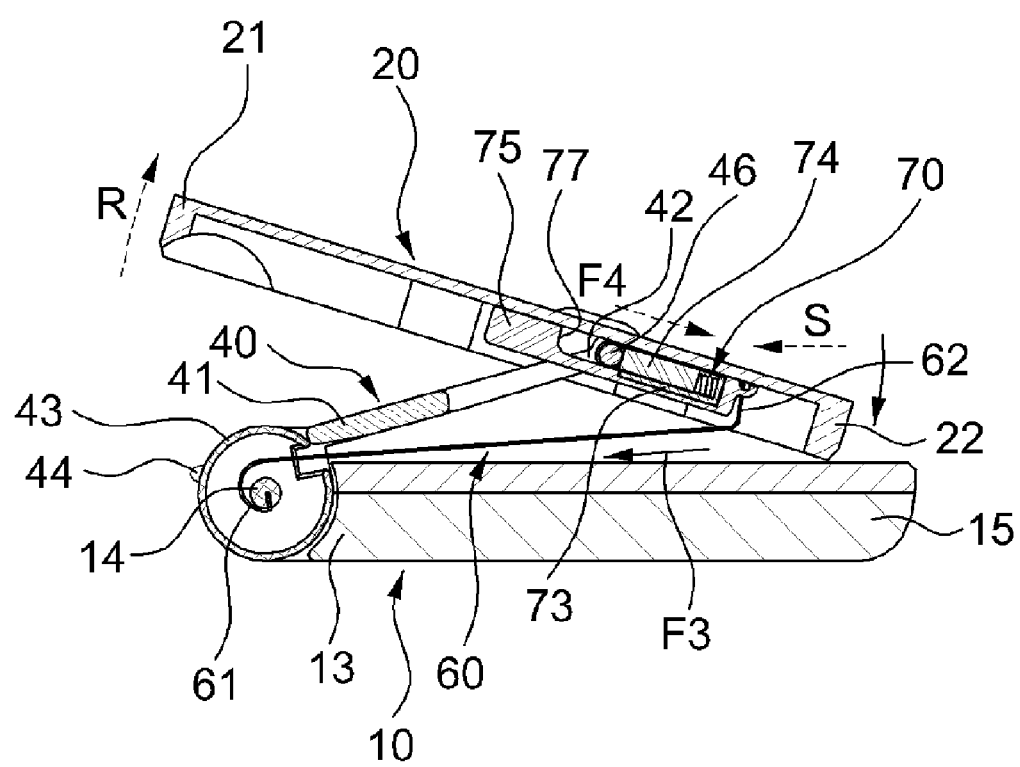
FIG. 6, FIG. 7, and FIG. 8 are cross-sectional views illustrating states where a second body of the terminal of FIG. 1 slides towards a second position.
Figure 7:
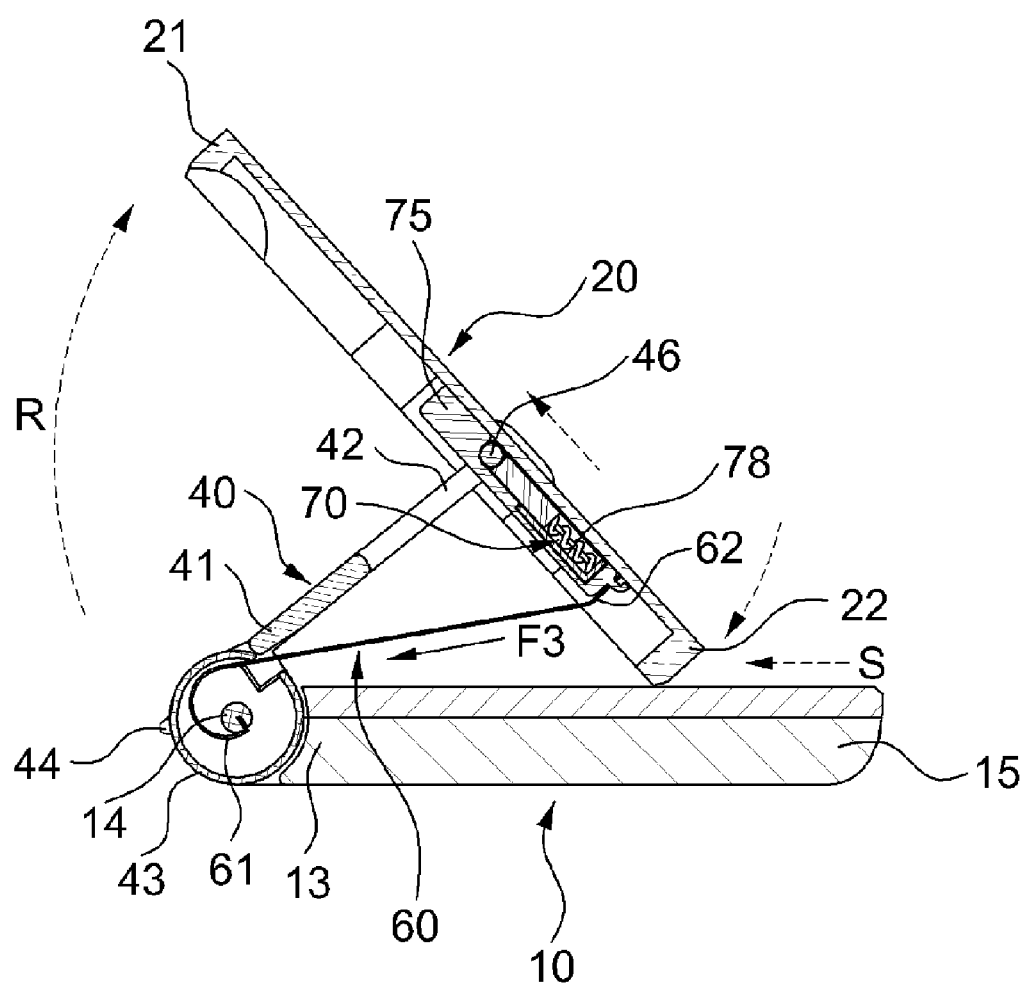

In addition, as illustrated in FIG. 6, if the second body 20 is rotated with respect to the pressurization rod 46 in the R direction to exceed an angle (hereinafter, referred to as 'critical angle') where the elastic force F4 of the second operator 70 is maximized, the second body 20 may be automatically moved in the sliding direction S, as illustrated in FIG. 7, while being continuously rotated in the direction R even if the pressurization force P exerted by the user is discontinued. In this instance, the second operator 70 may be restored toward an original state, and the pressurization rod 46 may be moved to its original position within the first groove 77.

Also, the moment caused by the rotation force F2 of the hinge 43 disposed to exceed the critical angle may be added to the elastic force F4 of the second operator 70 to thereby enable the second body 20 to slide towards the second position in an inclined manner.

Figure 8:
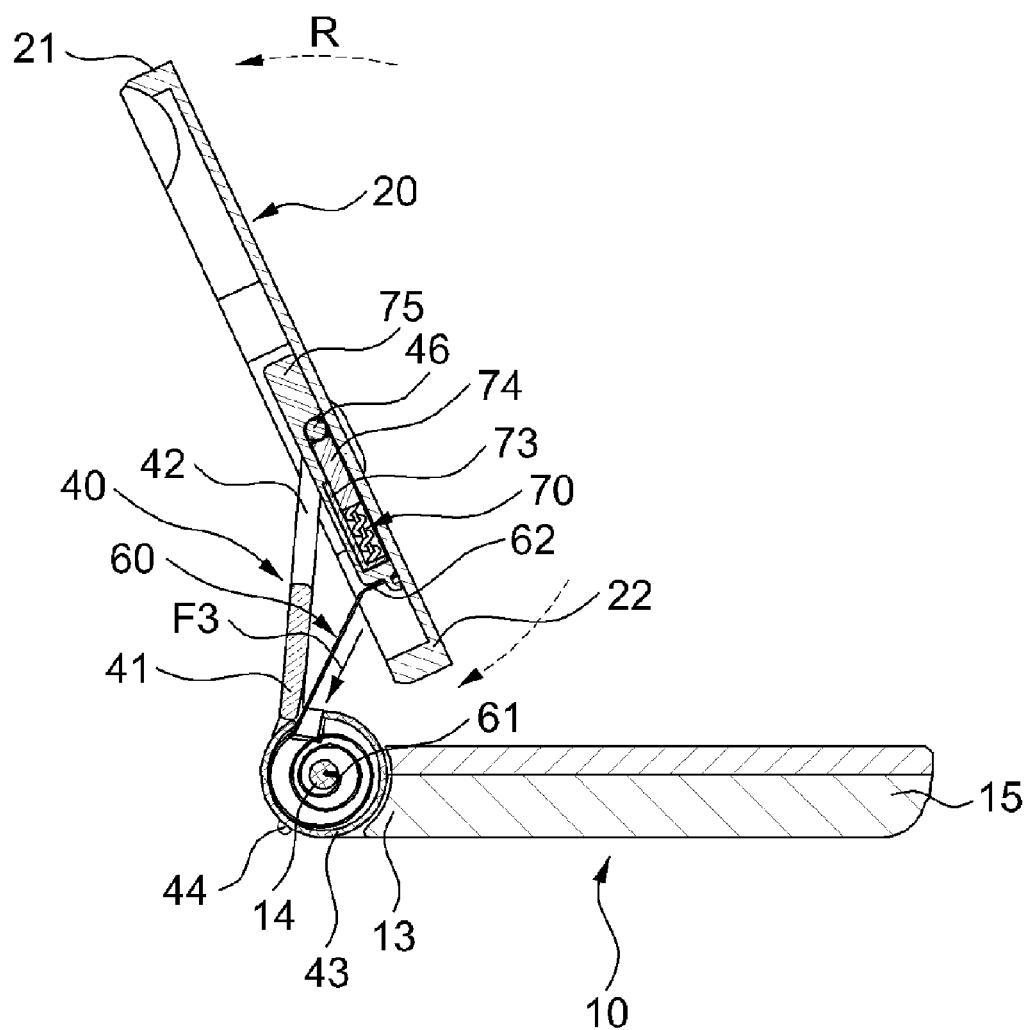
Figure 9:
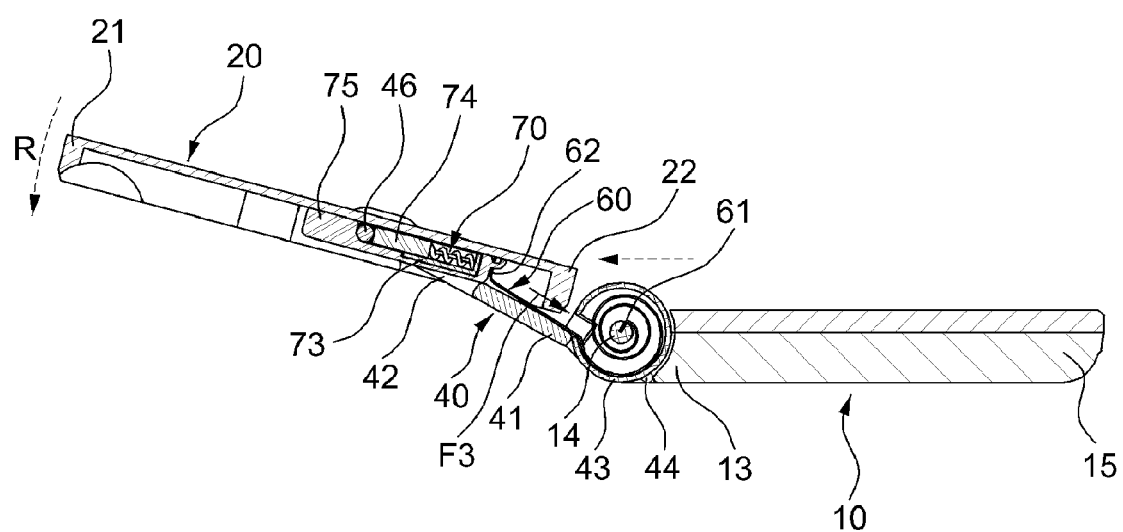
FIG. 9 is a cross-sectional view illustrating a state where the terminal of FIG. 1 is in a second position.

Thereafter, as illustrated in FIG. 8, the second end 62 of the first operator 60 may be continuously moved toward the first end 61 of the first operator 60 to enable the first end 61 to be wound around the hinge shaft 14. Thus, the second body 20 connected to the second end 62 may be continuously rotated in the direction R with respect to the pressurization rod 46 to be moved to the second position. Finally, as illustrated in FIG. 9, when the second body 20 is rotated until the hinge protrusion 44 disposed on the hinge 43 is contacted by the first body 10, the rotation of the second body 20 performed in the direction R with respect to the pressurization rod 46 and the sliding movement of the second body 20 to the second position may be stopped. Specifically, the hinge protrusion 44 may be contacted by the first body 10, thereby restricting the sliding movement of the second body 20.

In this manner, the sliding movement of the second body 20 to the second position may be completed. In addition, as illustrated in FIG. 9, if the second body 20 is to be moved back to the first position from the second position, the second body 20 may be moved to the first position by being pressurized towards the first position, i.e., by being subjected to the opposite processes of FIGS. 4 to 9.

As described above, the first operator 60 and the second operator 70 may be used as the clockwork spring and the compression spring, respectively, however, a variety of materials having an elastic force, such as rubber, may be used. In addition, although not illustrated in detail, a reinforcement to reinforce the first operator 60 may be further used.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A terminal, comprising: a first body; a second body connected to the first body; and a sliding apparatus to operate the first body and the second body between a first position in which the second body is disposed adjacent to the first body, and a second position in which the second body is inclined with respect the first body and the second body, wherein the sliding apparatus comprises: a connection body comprising a first end connected to the first body and a second end connected to the second body, the connection body being inclined with respect to the first body and the second body disposed in the first position; and an operator to transmit to the connection body a sliding operation force applied to the second body, the operator to semi-automatically operate the second body relative to the first body between the first position and the second position, wherein the operator comprises a first operator having a first end connected to the first body and a second end connected to the second body, the second end of the first operator being elastically pressurized toward the first end of the first operator, and a second operator disposed between the second body and the second end of the connection body, and the second operator being compressed in cooperation with a movement of the second body.

2. The terminal of claim 1, wherein, in the first position, a tilt angle between the first end of the connection body and the second end of the connection body is 3° to 7° with respect to the hinge shaft and the first body.

3. The terminal of claim 1, wherein the second body comprises a sliding groove to enable the second end of the connection body and the second operator to be disposed therein.

4. The terminal of claim 3, wherein the sliding groove comprise:

a first groove to provide an operation stroke of the second end of the connection body, and a second groove to provide a compression stroke of the second operator, a length of the compression stroke being 3.0 mm to 5.0 mm.

5. The terminal of claim 4, further comprising: a pressurization rod disposed in the second groove and connected to the second end of the connection body, wherein, when the second body slides between the first position and the second position, ends of the second body are rotated with respect to the pressurization rod.

6. The terminal of claim 5, wherein a pressurization body operated in cooperation with the second operator is disposed between the pressurization rod and the second operator.

7. The terminal of claim 1, wherein the first body comprises input keys, and the second body comprises a display portion, a front surface of the first body being exposed in the second position.

8. The terminal of claim 1, wherein the first operator comprises a clockwork spring to pressurize the second end of the first operator toward the first end of the first operator.

9. The terminal of claim 1, wherein the first body comprises a first side disposed adjacent to the second body when the first body and the second body are in the first position, and the second body comprises a first side disposed away from the first body when the first body and the second body are in the first position, and the first side of the first body is exposed when the first body and the second body are in the second position.

10. The terminal of claim 1, wherein a first side of the first body and a first side of the second body are disposed on a same side of the terminal when the first body and the second body are in the second position.

11. The terminal of claim 1, wherein the first body comprises a front end and a rear end, and the second body comprises a front end and a rear end, and the connection body is connected to the first body at the front end of the first body and connected to the second body closer to the rear end than the front end of the second body.

12. The terminal of claim 1, wherein the second operator compresses and expands during the movement of the first body and the second body between the first position and the second position.

13. A sliding apparatus for a terminal comprising a first body and a second body, the apparatus comprising:
a connection body connected to the first body at a first end of the connection body and connected to the second body at a second end of the connection body, the connection body being inclined with respect to the first body and the second body when the first body and the second body are disposed in a first position in which the second body is disposed on the first body, the first end of the connection body being coupled to the first body, and the second end of the connection body being movable within a sliding groove disposed on the second body;
a first operator connected to the first body at a first end of the first operator and connected to the second body at a second end of the first operator, the second end of the first operator being pressurized toward the first end of the first operator; and
a second operator disposed between the second body and the second end of the connection body and selectively compressed in cooperation with a sliding movement of the second body.

14. The sliding apparatus of claim 13, further comprising: a hinge connected to the first end of the connection body, the hinge being a click hinge comprising a hinge protrusion disposed to restrain a sliding range of the second body.

15. The sliding apparatus of claim 13, wherein, in the first position, a tilt angle between the first end of the connection body and the second end of the connection body is 3° to 7° with respect to the hinge and the first body.

16. The sliding apparatus of claim 13, wherein the second body comprises a sliding plate comprising the sliding groove disposed on the second body, wherein the second end of the connection body and the second operator are disposed in the sliding groove, and wherein the sliding groove provides a compression stroke having a stroke length of 3.0 mm to 5.0 mm.

17. The sliding apparatus of claim 16, further comprising a pressurization rod disposed in the sliding groove and connected to the second end of the connection body, wherein, when the second body slides between the first position and a second position, ends of the second body are rotated with respect to the pressurization rod, the second body being inclined with respect to the first body in the second position.

18. The sliding apparatus of claim 13, wherein the first operator comprises a clockwork spring, and the second operator comprises a coil spring.

19. A terminal, comprising: a first body; a second body connected to the first body; and a sliding apparatus to operate the first body and the second body between a first position in which the second body is disposed adjacent to the first body, and a second position in which the second body is inclined with respect the first body and the second body, wherein the sliding apparatus comprises: a connection body comprising a first end connected to the first body and a second end connected to the second body, the connection body being inclined with respect to the first body and the second body disposed in the first position; and an operator to transmit to the connection body a sliding operation force applied to the second body, the operator to semi-automatically operate the second body relative to the first body between the first position and the second position, wherein the operator comprises a first operator having a first end connected to the first body and a second end connected to the second body, the second end of the first operator being elastically pressurized toward the first end of the first operator, and a second operator disposed between the second body and the second end of the connection body, and the second operator being compressed in cooperation with a movement of the second body.

* * * * *